May 8, 1923.
R. PEALE
1,454,602
CAR HANDLING AND DUMPING SYSTEM
Filed Sept. 12, 1919 14 Sheets-Sheet 4
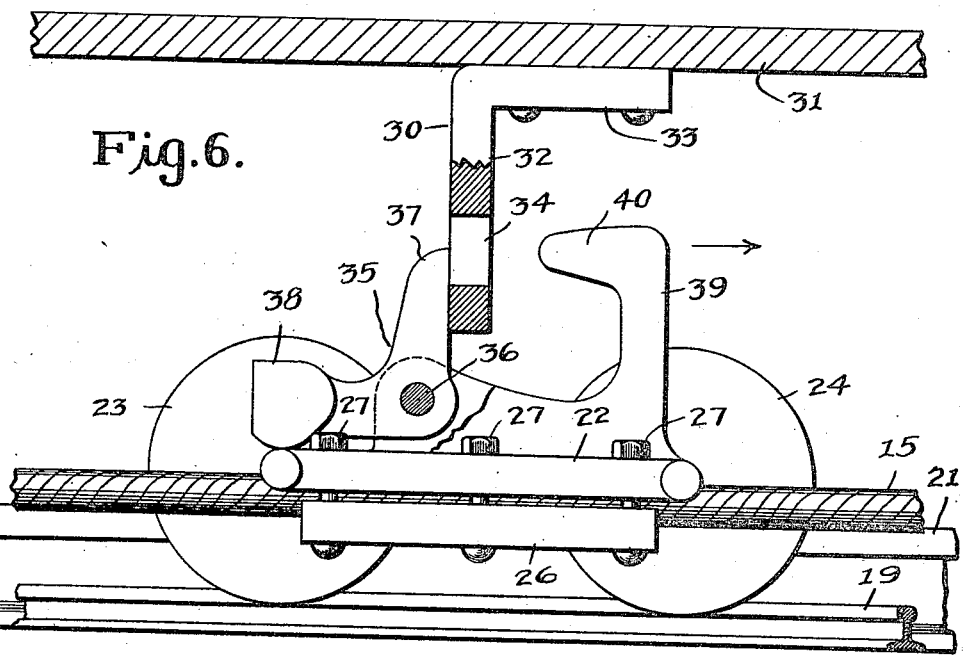
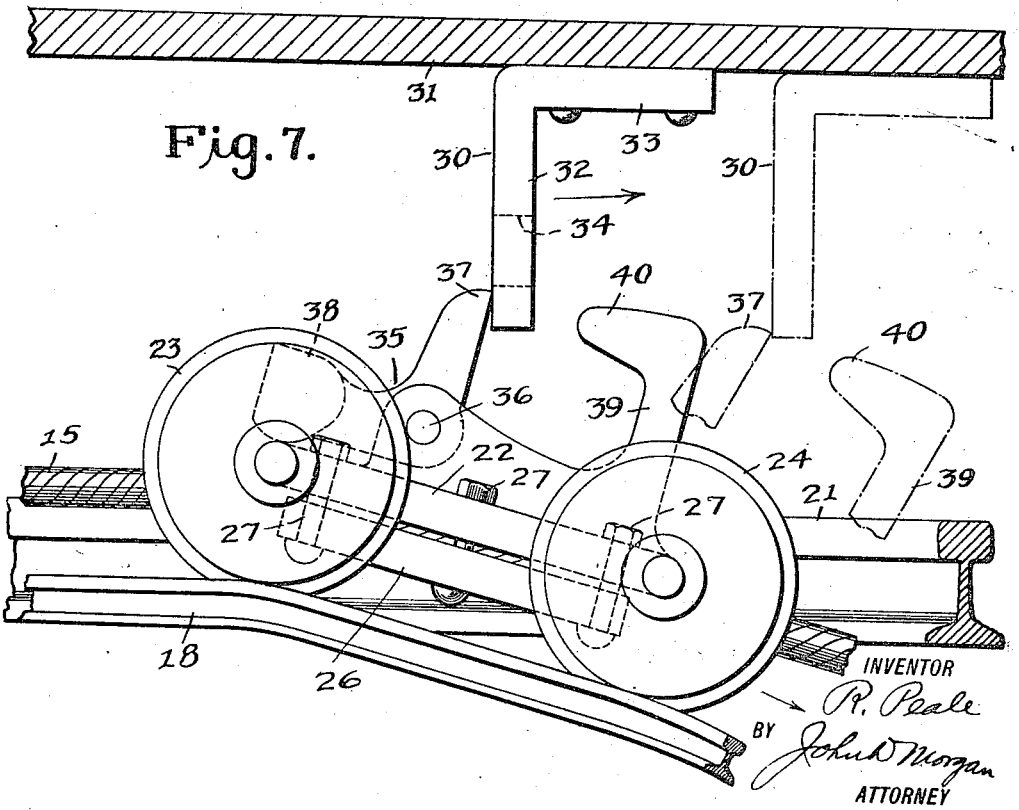
INVENTOR
R. Peale
BY
John D. Morgan
ATTORNEY May 8, 1923.
R. PEALE
1,454,602
CAR HANDLING AND DUMPING SYSTEM
Filed Sept. 12, 1919  14 Sheets-Sheet 5
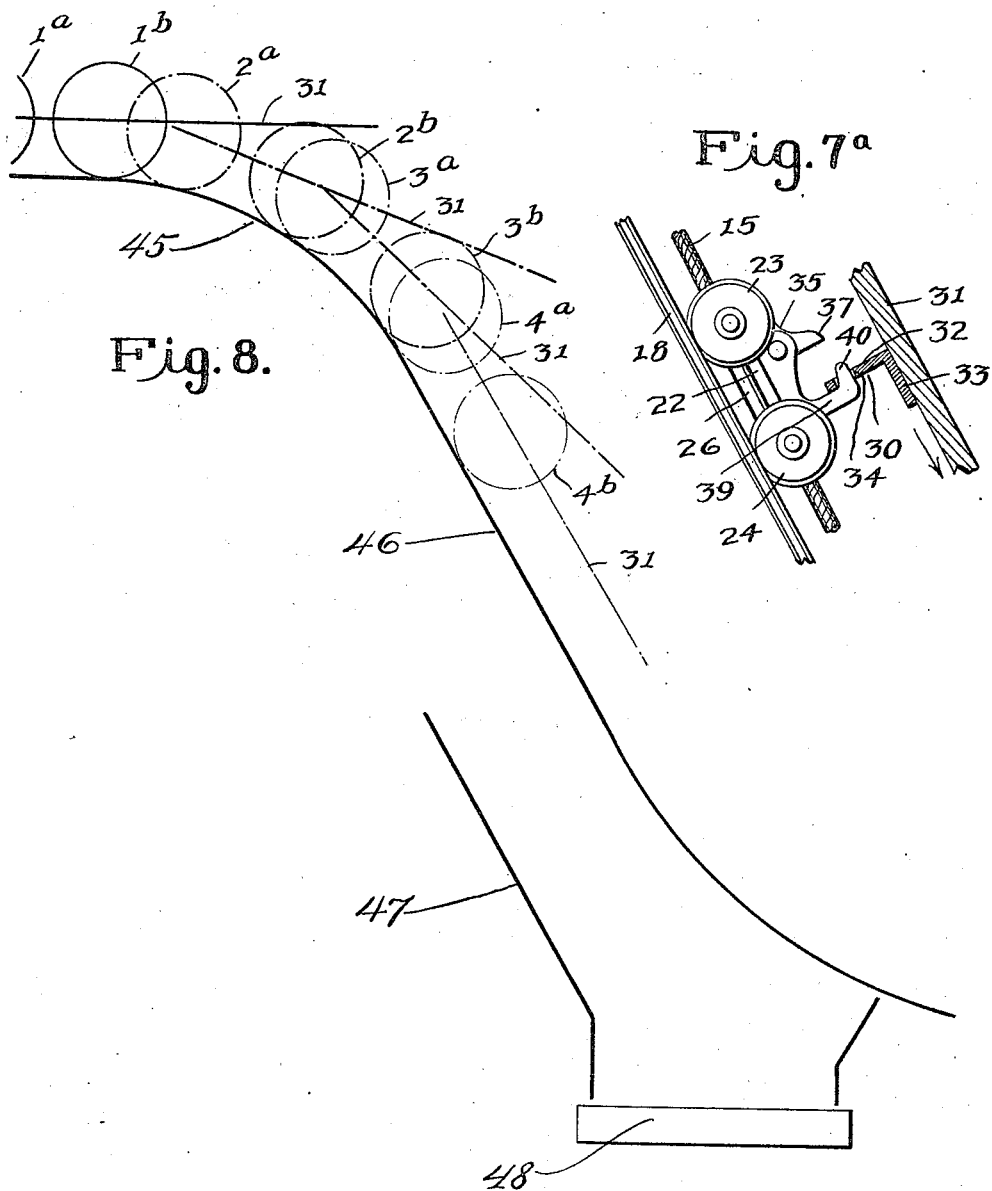

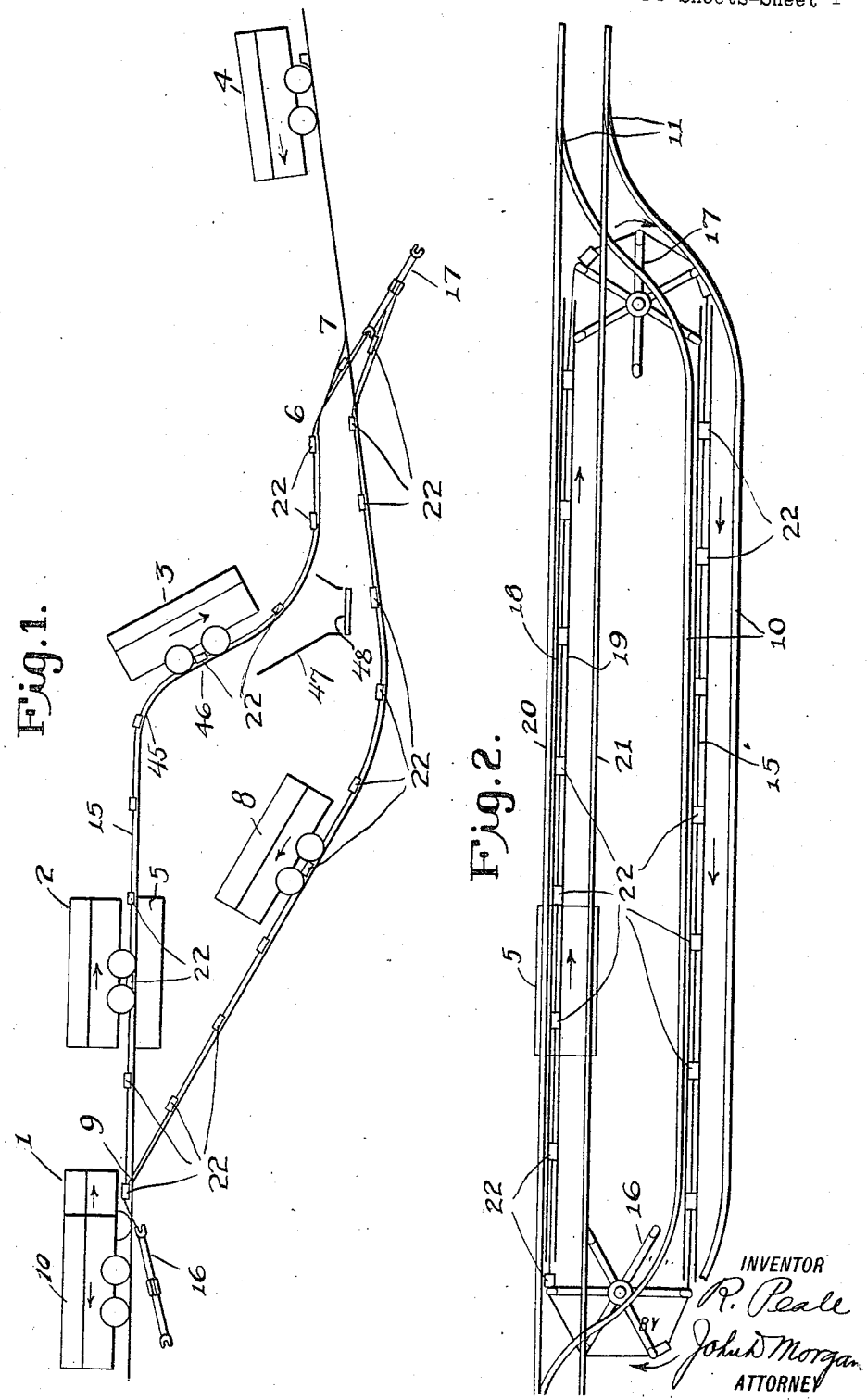

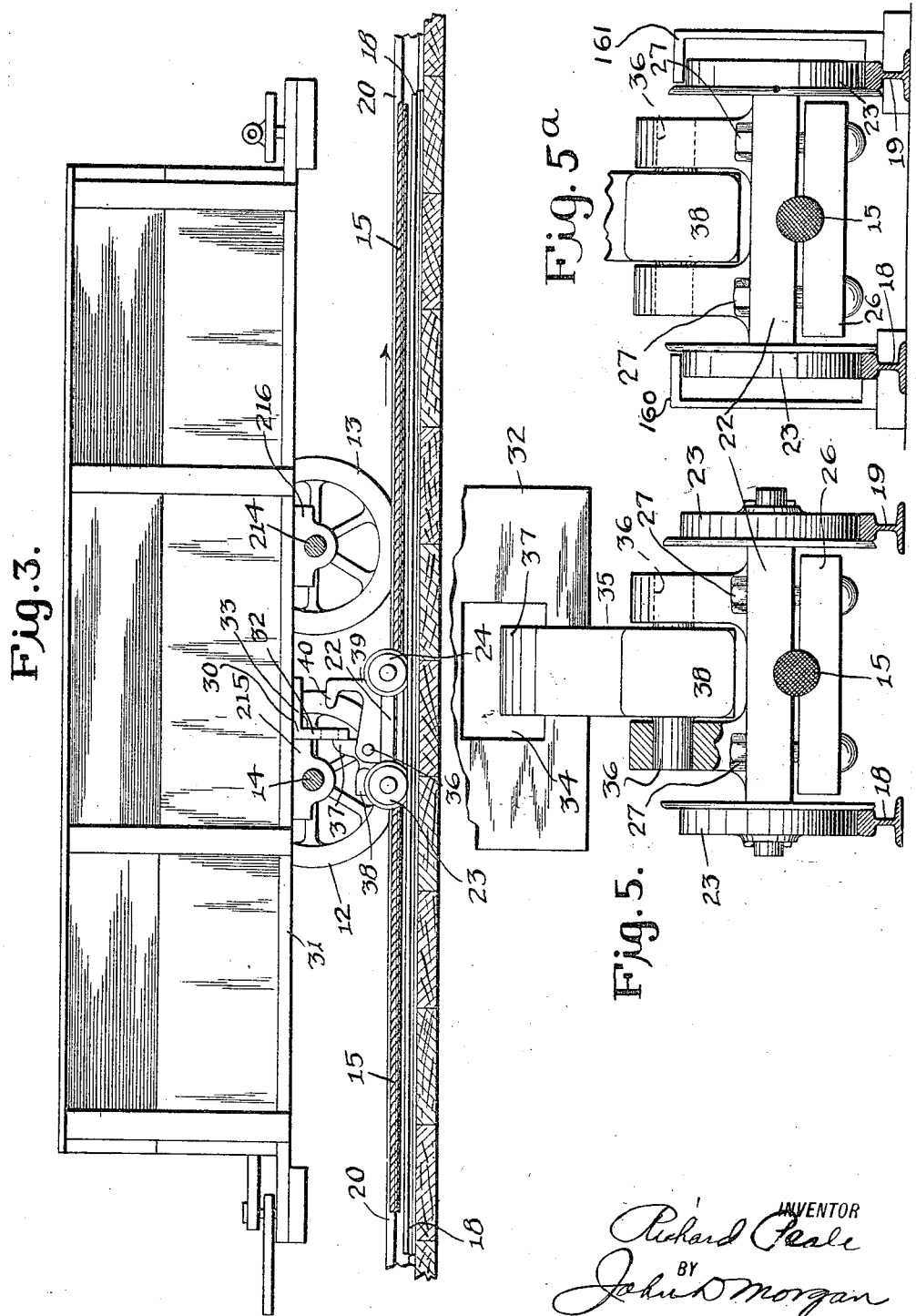

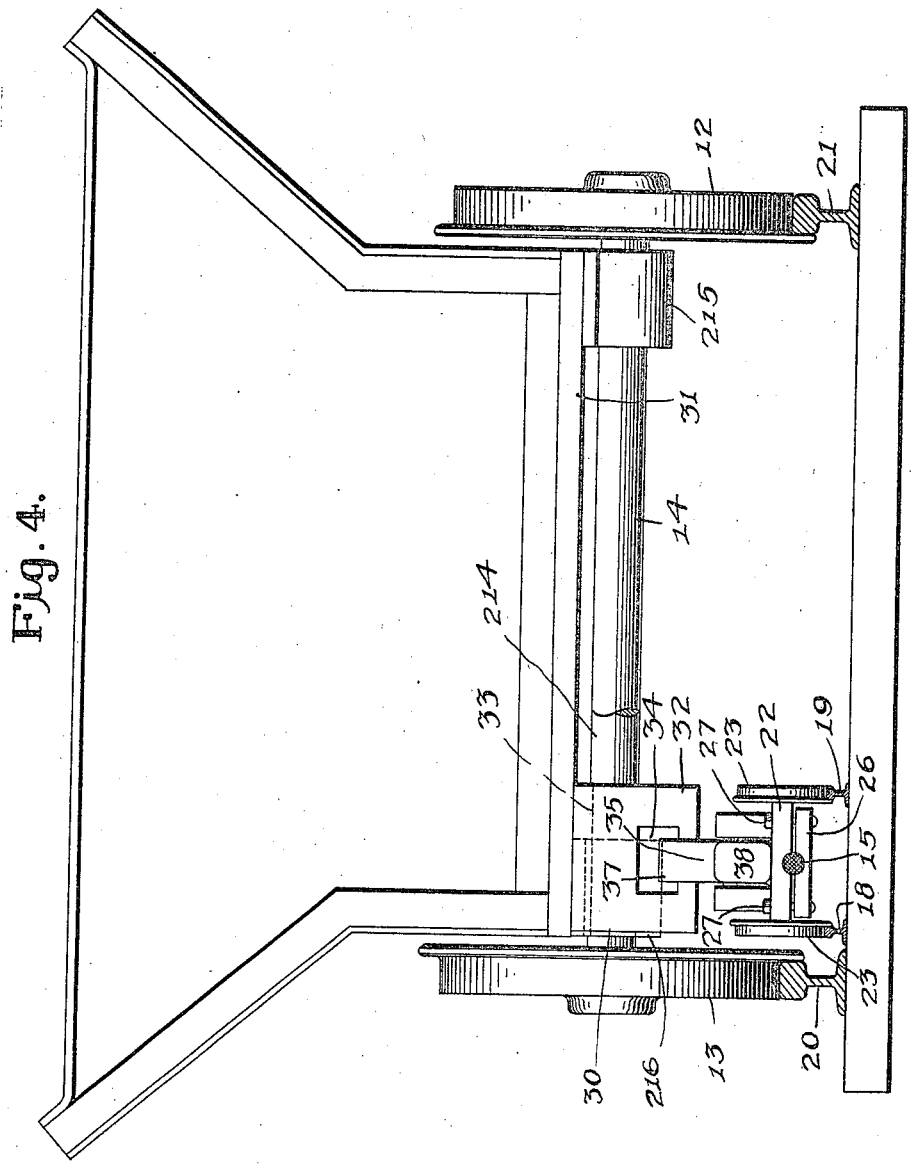

May 8, 1923.

R. PEALE 1,454,602

CAR HANDLING AND DUMPING SYSTEM

Filed Sept. 12, 1919      14 Sheets-Sheet 6

INVENTOR
R. Peale
BY
John D. Morgan
ATTORNEY

May 8, 1923.
R. PEALE
1,454,602
CAR HANDLING AND DUMPING SYSTEM
Filed Sept. 12, 1919 14 Sheets-Sheet 7
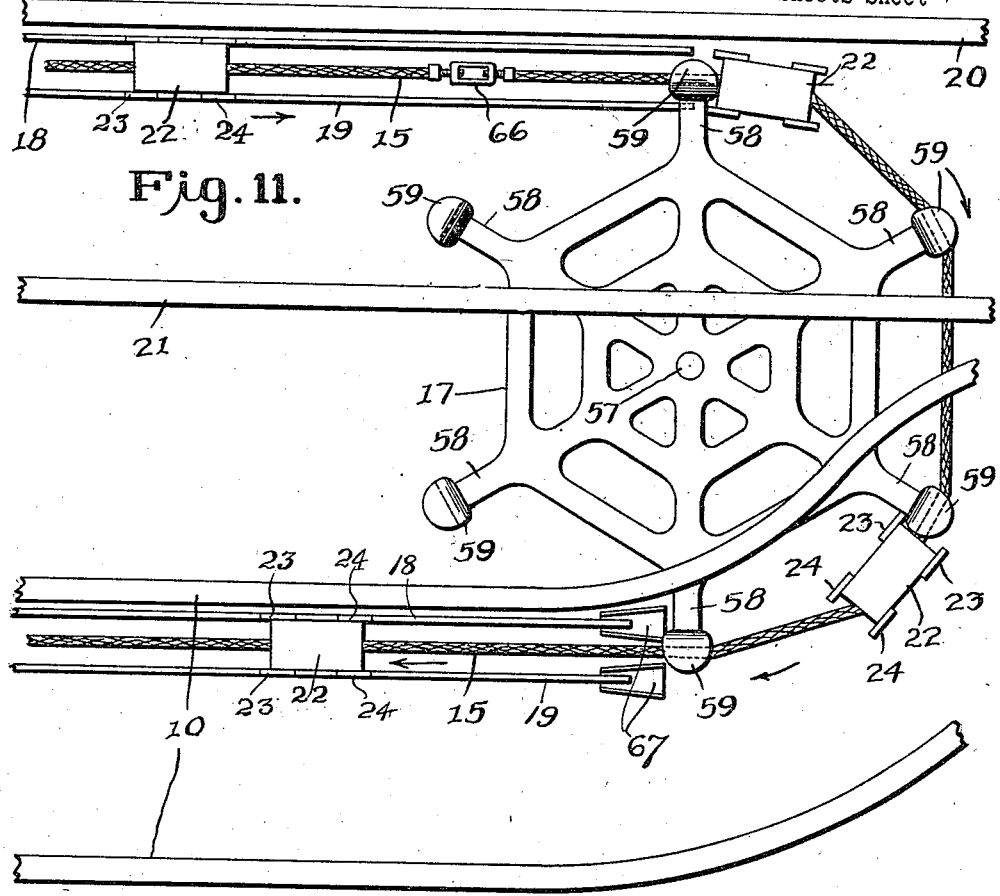
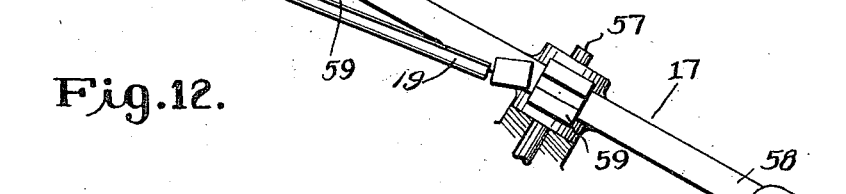
INVENTOR
R. Peale
BY
John D Morgan
ATTORNEY

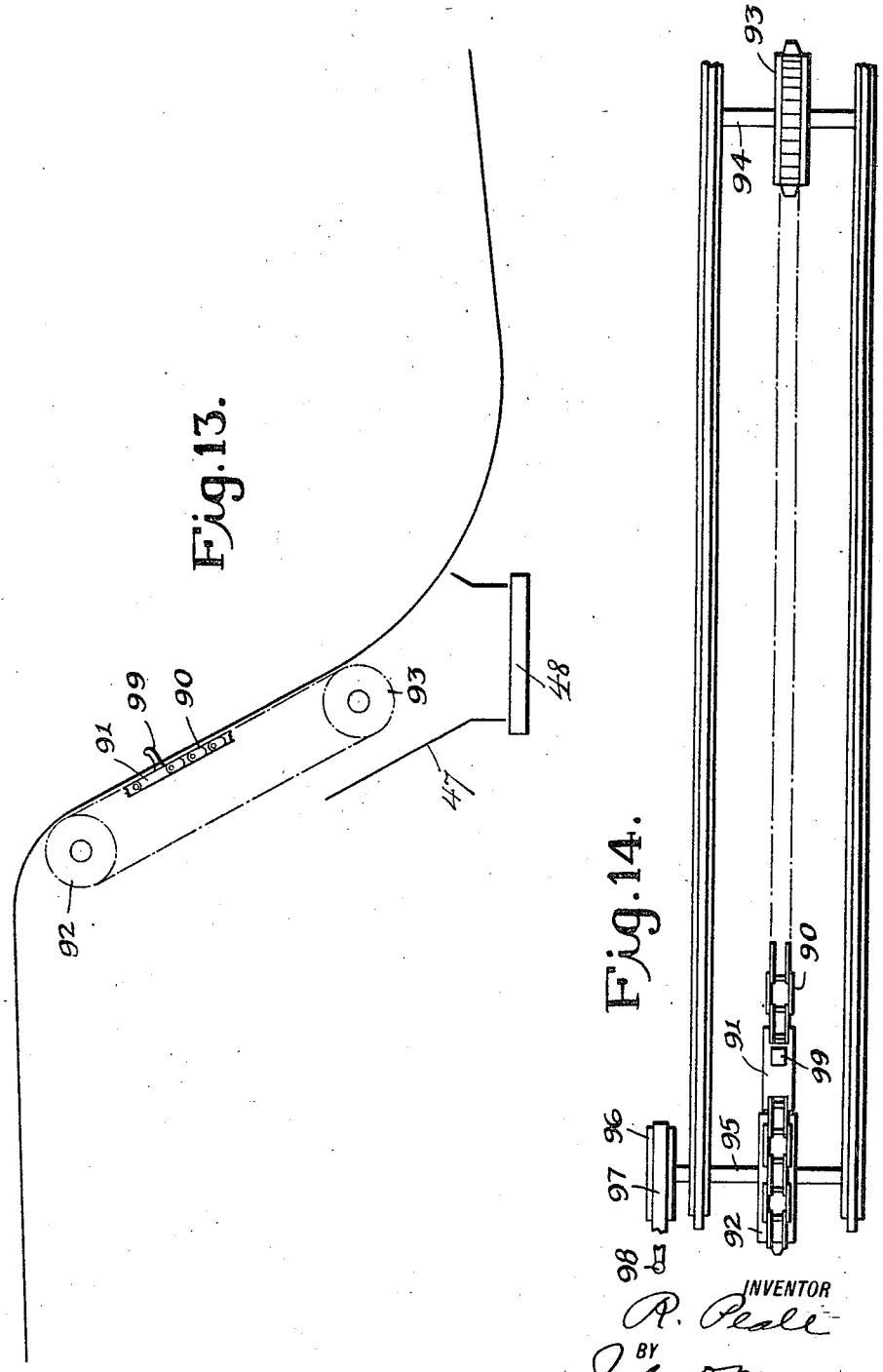

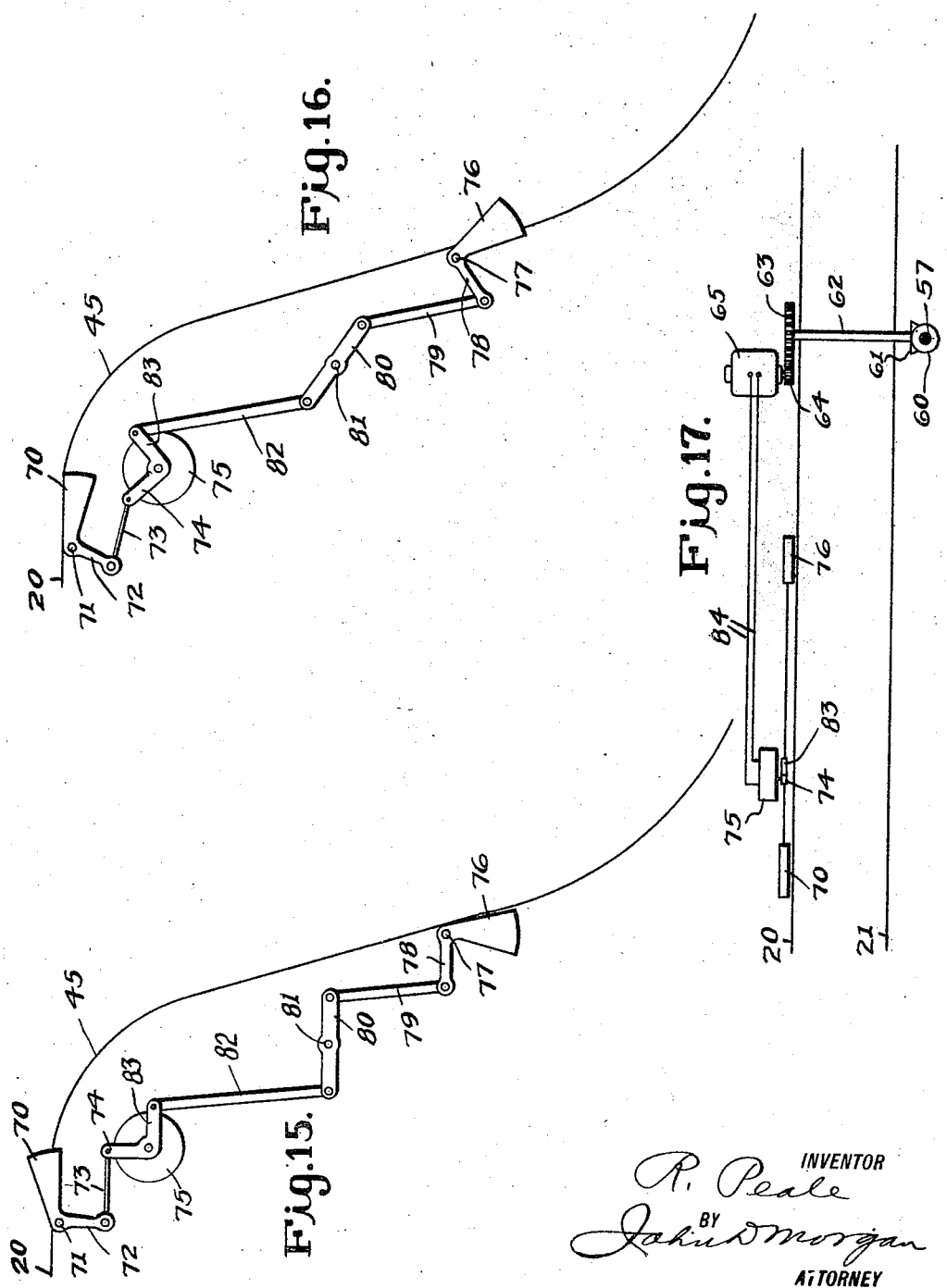

May 8, 1923.
R. PEALE
1,454,602
CAR HANDLING AND DUMPING SYSTEM
Filed Sept. 12, 1919  14 Sheets-Sheet 10
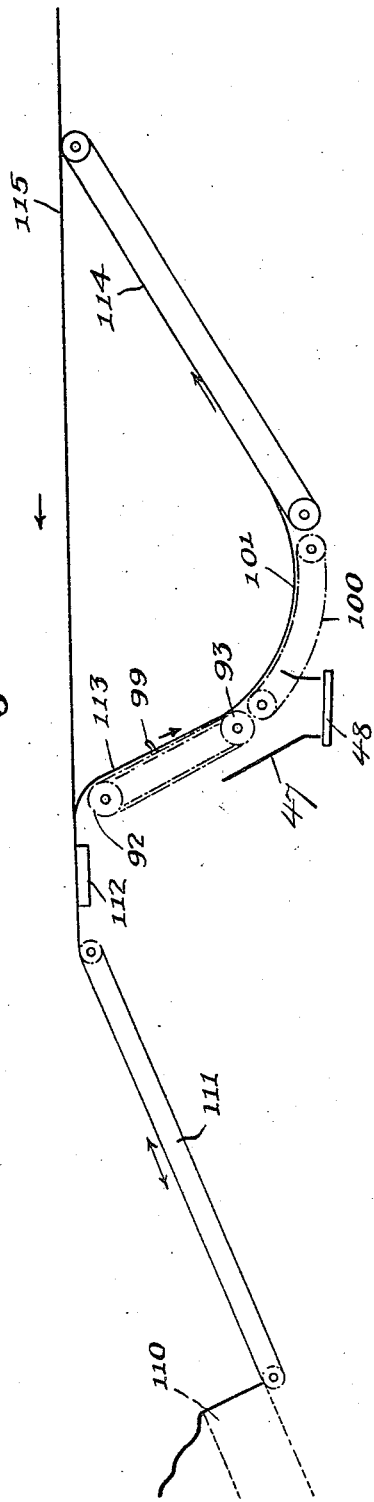
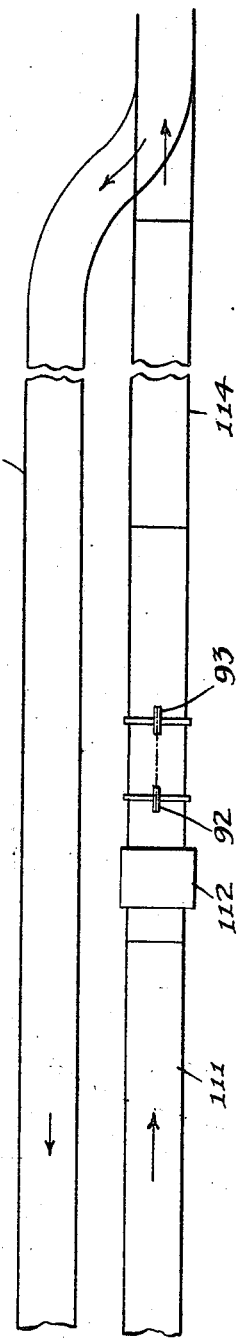
INVENTOR
R. Peale
BY
John D Morgan
ATTORNEY May 8, 1923.

R. PEALE 1,454,602

CAR HANDLING AND DUMPING SYSTEM

Filed Sept. 12, 1919   14 Sheets-Sheet 11

INVENTOR
R. Peale
BY
John D. Morgan
ATTORNEY

May 8, 1923. 1,454,602
R. PEALE
CAR HANDLING AND DUMPING SYSTEM
Filed Sept. 12, 1919 14 Sheets-Sheet 12

INVENTOR
R. Peale
BY
John D Morgan
ATTORNEY

May 8, 1923.

R. PEALE 1,454,602

CAR HANDLING AND DUMPING SYSTEM

Filed Sept. 12, 1919

INVENTOR

R. Peale

BY

John D Morgan

ATTORNEY

Patented May 8, 1923.

1,454,602

UNITED STATES PATENT OFFICE.

RICHARD PEALE, OF ST. BENEDICT, PENNSYLVANIA, ASSIGNOR TO REMBRANDT PEALE, OF ST. BENEDICT, PENNSYLVANIA.

CAR HANDLING AND DUMPING SYSTEM.

Application filed September 12, 1919. Serial No. 323,264.

*To all whom it may concern:*

Be it known that I, RICHARD PEALE, a citizen of the United States, residing at St. Benedict, Pennsylvania, have invented certain new and useful Improvements in Car Handling and Dumping Systems, of which the following is a specification.

The invention relates to a car dumping and handling system and mechanism, and more especially, in certain aspects thereof, the invention relates to the dumping and handling of mine cars.

Objects and advantages of the invention will be set forth in part hereinafter, and in part will be obvious herefrom, or may be learned through practice with the invention.

The invention consists in the novel parts, constructions, arrangements, combination and improvements herein shown and described.

The accompanying drawings, referred to herein and constituting a part hereof, illustrate one embodiment of the invention, and together with the description, serve to explain the principles of the invention.

Of the drawings:—

Fig. 1 is a diagrammatic elevation of a mechanism and track arrangement or system constructetd in accordance with the invention;

Fig. 2 is a diagrammatic top plan corresponding to Fig. 1, but omitting the cars;

Fig. 3 is a fragmentary elevation, showing a mine car with the driving mechanism propelling the car, and with the rear wheels of the car omitted to show the driving or hauling and holding mechanism;

Fig. 4 is a rear end elevation, looking at Fig. 3 from the left, of the mine car and car propelling mechanism, with one car wheel and part of its axle omitted;

Fig. 5 is a rear end fragmentary elevation, on an enlarged scale, of the car drive and the driving plate on the car, looking at the corresponding parts at Fig. 3 from the left, and corresponding to the lower left-hand part of Fig. 4;

Figure 9:
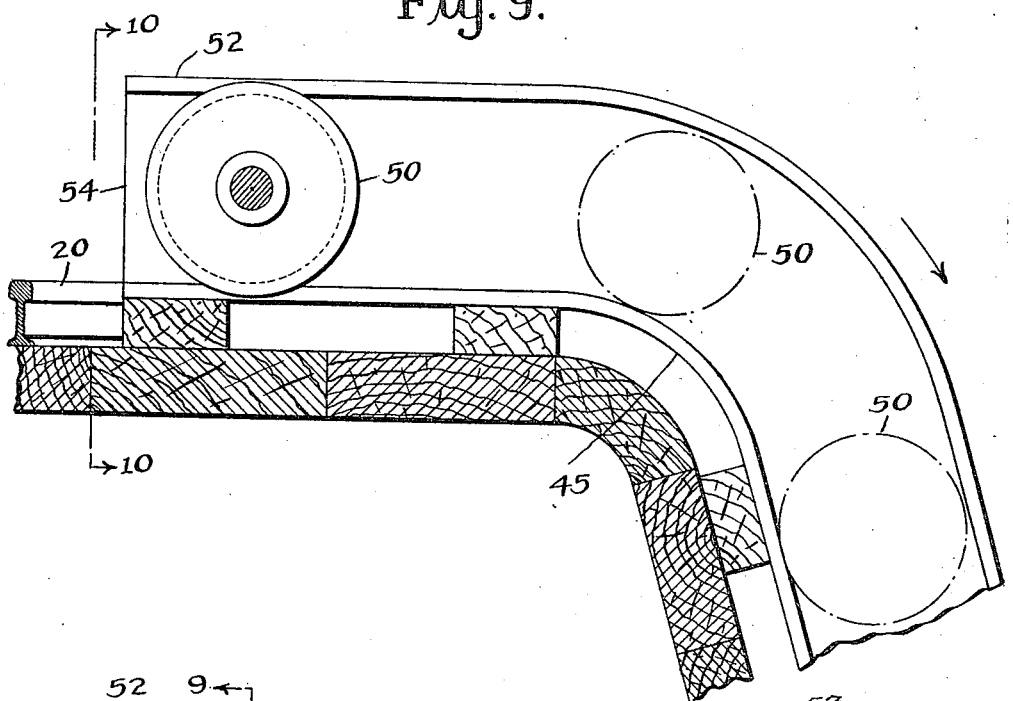
Figure 10:
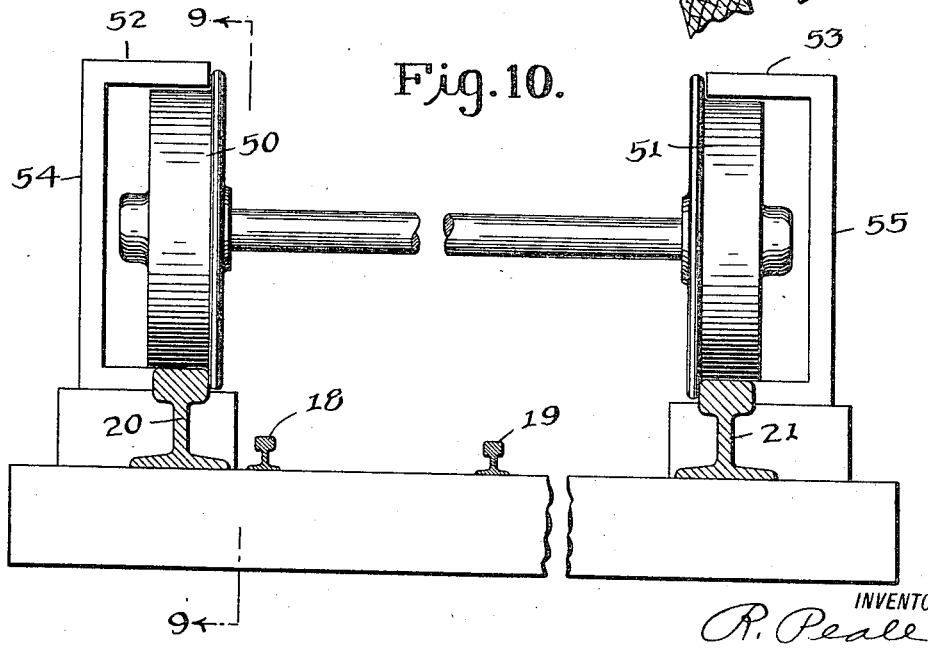
Figure 20:
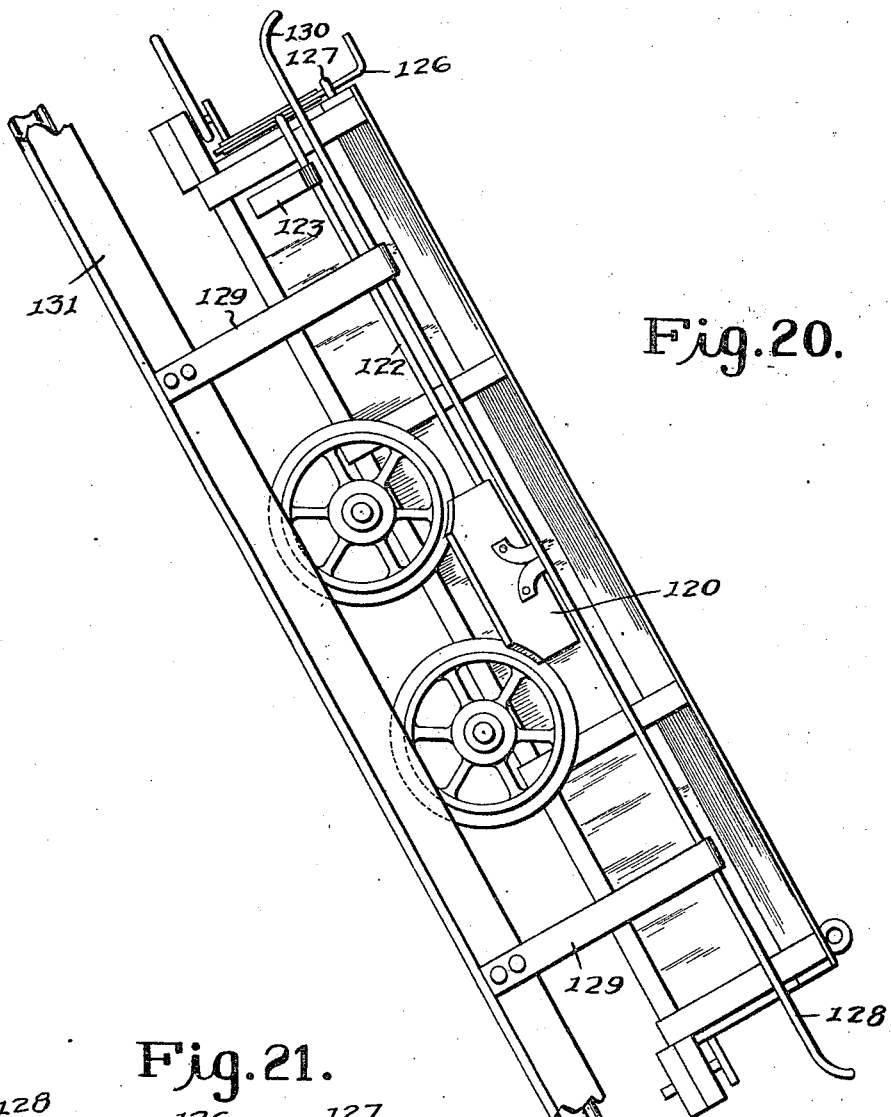
Figure 21:
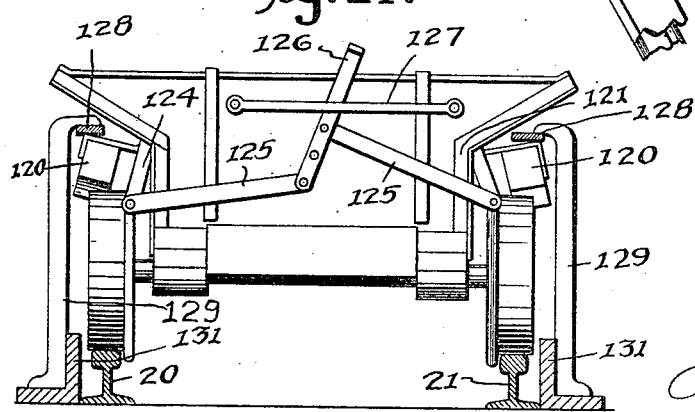
Figure 22:
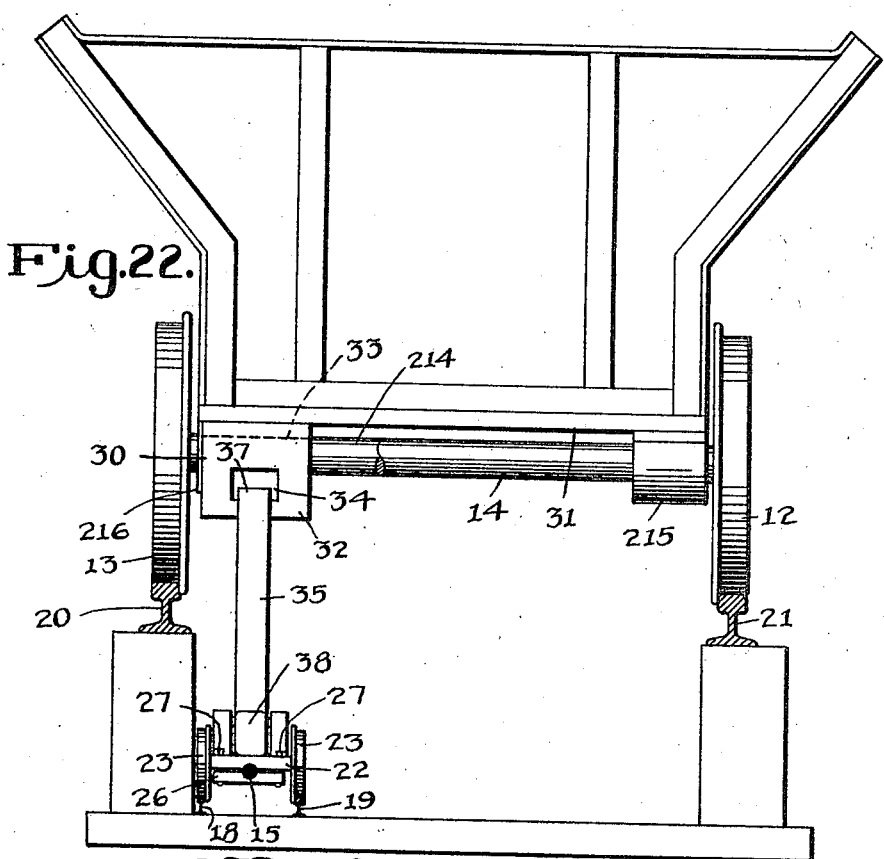
Figure 23:
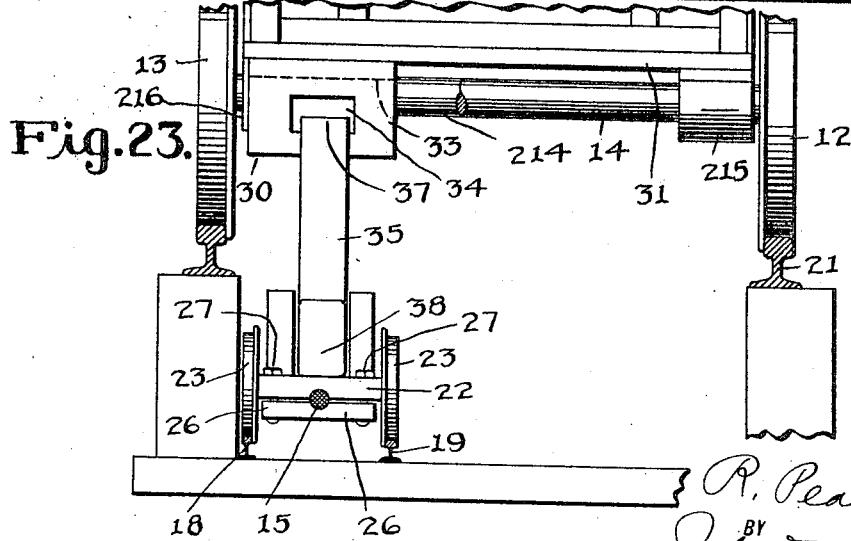
Figure 24:
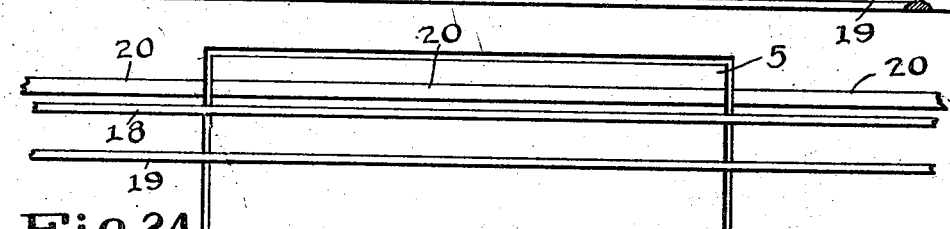
Figure 25:
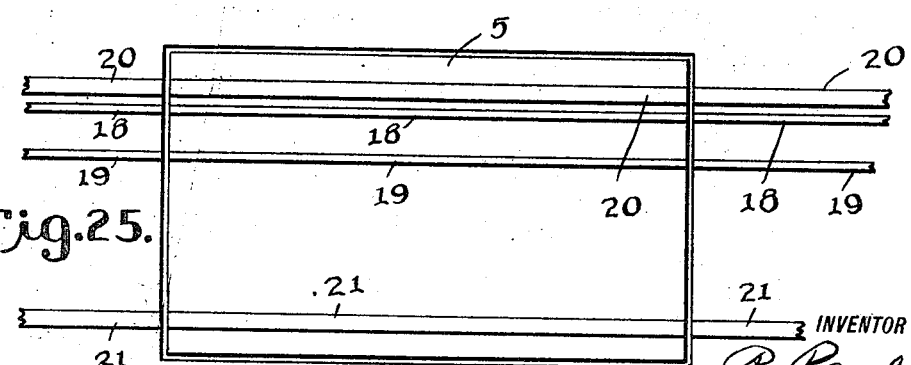

Fig. 5ª is a similar view, but showing the channel guides for the wheels of the hauling and holding device;

Fig. 6 is a fragmentary side elevation, with the front wheels omitted, corresponding to Fig. 5, and looking thereat from the right and corresponding also to the lower central part of Fig. 3;

Fig. 7 is a view similar to Fig. 6, but showing the car hauling and holding device and car at the time of discharge of the car from the drive;

Fig. 7ª corresponds to Figs. 6 and 7, but showing the car being held back as it passes over the steep incline of the dump;

Fig. 8 is a diagrammatic detail in elevation or profile, showing the dump and chute and in dot and dash lines the successive positions of a car being discharged;

Fig. 9 is fragmentary detail taken on line 9—9 of Fig. 10, on an enlarged scale, of one form of device for holding the car on the track in going over the dump;

Fig. 10 is a fragmentary detail view, partly in section and partly in elevation on line 10—10 of Fig. 9;

Fig. 11 is an enlarged detail plan of a driving and guiding mechanism for the train of car hauling and holding devices;

Fig. 12 is a fragmentary detail elevation, corresponding to Fig. 11, and looking thereat from the bottom of that figure, and also showing diagrammatically the track arrangement;

Fig. 13 is an elevation, more or less diagrammatic, of a gravity operating form of the device applied to the dump only;

Fig. 14 is a top plan, partly diagrammatic, corresponding to Fig. 13;

Figs. 15 and 16 are diagrammatic elevations of the speed control for the cars in passing on to and over the dump;

Fig. 17 is a diagrammatic top plan, corresponding to Figs. 15 and 16;

Fig. 18 is a diagram in elevation, or profile of a different arrangement of tracks applied to a mine slope;

Fig. 19 is a plan corresponding to Fig. 18;

Fig. 20 is a fragmentary detail, on an enlarged scale, of a different form of means for holding on the track on the dump incline a car having a standard form of brake mechanism;

Fig. 21 is an end elevation corresponding to the top end of Fig. 20;

Fig. 22 shows a modified form of car hauling and holding device, which permits the end of the car body to pass down between the tracks without interfering with the hauling and holding mechanism;

Fig. 23 is another form of the same kind of device as Fig. 22;

Figs. 24 and 25 are plans of two forms of the mechanism at the weighing scales;

Fig. 26 is a diagrammatic form of the device dumping the car while ascending the dump incline;

Fig. 27 is a plan corresponding to Fig. 26; and

Figure 28:
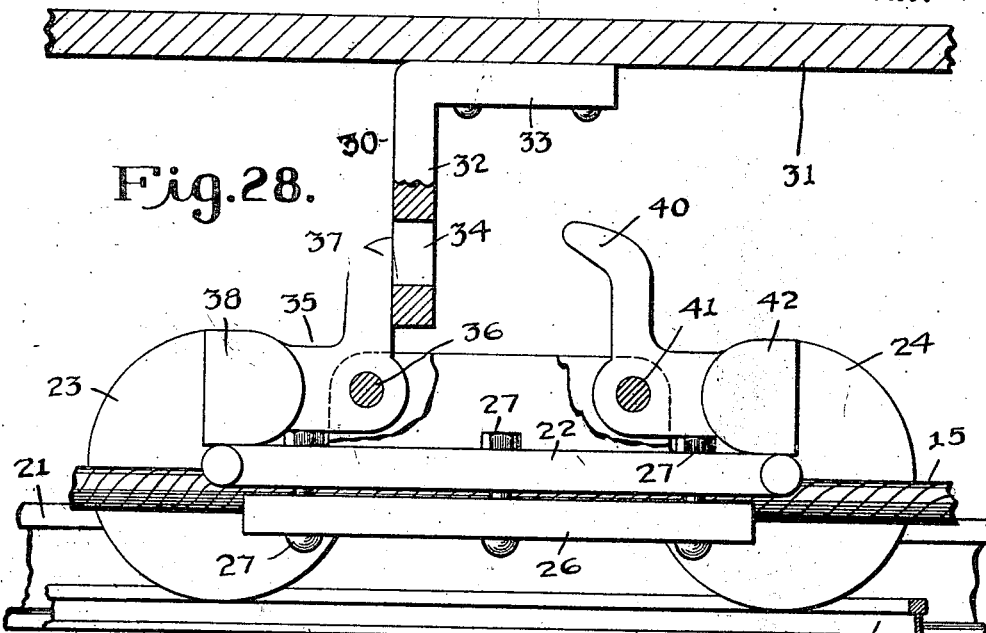

Fig. 28 is a fragmentary elevation, with the front wheels omitted, of a form of the car hauling and holding device adapted to overtake and engage the car as well as adapted to be overtaken by the car.

The invention in certain of its aspects, and as embodied, provides a complete loaded car handling, car dumping and empty car returning system and mechanism, which controls the cars at all times, keeps them continuously moving, dumps the cars without stopping, and reverses their travel after dumping, and handles the cars as they come, irrespective of the locations of other cars. The invention includes features which may be used independently of the complete system and mechanism as outlined above; which features, together with others, will be described hereinafter, or will be obvious from the description and drawing, or may be learned by practice with the invention. The invention as embodied and described herein is applied to a coal mine.

Referring now in detail to the accompanying drawings, Fig. 1 is a diagrammatic elevation or profile, of one embodiment of a car handling, dumping, reversing and returning system constructed in accordance with the invention. Fig. 2 is a corresponding plan, likewise more or less diagrammatic. These figures are not drawn to scale, but are designed to give a clear idea of the entire system and mechanism in a single figure, or pair of figures of the drawing.

Referring to the illustrated embodiment of the drawings, loaded cars are supplied from the mine mouth, or otherwise as convenient. In Figs. 1 and 2 is shown one system or arrangement of tracks. The loaded car 1 is shown at the left in Fig. 1, coming into the system or mechanism, the car being automatically engaged by the car hauling and holding mechanism, as will be hereinafter described more in detail, and thereafter the car is both hauled and held by this mechanism as it travels over the dump and is released to the direction reversing tracks when empty. After being reversed in direction, the car is again engaged by the hauling and holding means and restored or returned empty to the mine mouth or other suitable place of delivery. The car hauling and holding devices pass along sequentially at relatively close intervals, so that each loaded car is quickly taken as it comes on, irrespective of the position or location of preceding and following cars, and thus the system and mechanism adapts itself completely to regular or irregular, and to frequent or infrequent supply of loaded cars from the mine or other source.

The direction of travel of the cars in Fig. 1 is indicated by the arrows thereon. The car 1, as stated, is approaching the point or place where it is engaged by the car hauling and holding mechanism, and the car 2 is passing over a weighing scale 5, while being hauled and held by the mechanism. Car 3 is being held as it descends the dump, or car emptying portion of the track or system, and just after the car has been emptied of its contents. The empty car 4 is shown at the point or place of reversal of its travel, the car being preferably impelled by gravity, and is directed by a spring or snap switch 11 to the point where the hauling and holding device reengages it to elevate it and haul it along return track 10 to the place of delivery.

The recently dumped car is released from the hauling and holding mechanism at the point 6, and runs by gravity to the position shown in Fig. 1, and then, preferably by gravity, runs backward and is switched to the parallel track, and is taken on again by the hauling and holding mechanism at the point 7. The car 8 is being hauled thereby upwardly to the point 9, which is the point or place where both the empty returning cars and the advancing loaded cars, respectively, leave and enter the car hauling and holding mechanism. The car 10ᵃ has just parted from the hauling and holding mechanism and is traveling in the direction of the arrow. The cars are shown provided with pairs of wheels 12 and 13, having their respective axles 14 and 214 mounted in journal boxes 215 and 216.

Referring now to the details of construction of the present preferred form of holding and hauling mechanism (see especially Figs. 1 to 7), an endless series of regularly spaced apart car pushing and holding devices pass along the track for the loaded cars, and over the dump in one direction, and pass in the opposite direction along the track for the returning empty cars.

The endless carrier is shown as a cable or chain 15, passing along the loaded and empty tracks in opposite directions, as stated, and passing over guiding wheels or sheaves 16 and 17 (Figs. 2, 11 and 12), one of which is preferably the driving means for the system or mechanism.

The car hauling and holding devices, as embodied and illustrated (see especially Figs. 3 to 7ᵃ), are preferably designed to run upon a track having rails 18 and 19, spaced within the car track rails 20 and 21 (Figs. 2, 3, 4 and 11). The body 22 of the hauling and holding device is provided with two pairs of wheels 23 and 24, running respectively on the tracks 18 and 19. These tracks are arranged or located either centrally of the track 20 and 21, or at one side, that is closely adjacent to either one rail or the other. The latter position or arrangement is illustrated in Figs. 2, 4 and 11. By this arrangement, a larger clear dumping space is provided in the trackway, which is convenient where some of the coal is in large lumps; while under certain conditions it is advisable or preferable to have the hauling and holding device centrally positioned with respect to the tracks for the coal car.

Means are provided for fastening the hauling and holding devices to the chain or cable 15 (see especially Figs. 5 and 6), and as embodied the body 22 of the device cooperates with a clamping plate 26, located preferably therebeneath, the body and plate on their adjoining faces being shaped to receive the chain or cable 15. Means are provided for clamping the body and plate together, to firmly hold the chain or cable 15, and as embodied, a series of bolts 27 pass through the body and plate, and cause them to grip the chain or cable 15 and the hauling and holding device firmly together. While it will be clear that many forms of fastening means might be employed, the embodied device possesses the advantages of firmly holding or clamping the hauling and holding device in place on the chain or cable, and at the same time it provides for practically unlimited changes in the position or location of the hauling and holding devices without cutting the cable or requiring elaborate special fastenings which must be made and remade with each such change or adjustment.

Referring now to the embodied form of car engaging and holding means, cooperating devices are provided both upon the car and upon the device 22 (see especially Figs. 3, 4, 5 and 6). As embodied, an angle plate 30 has one leg 33 thereof bolted or otherwise fastened to the bed or bottom 31 of the car, and the other leg 32 extending downwardly for engagement with the hauling and holding device. The leg 33 may in certain cases be slipped in between an axle and the bed of the car, and this can be done conveniently when the hauling and holding device is located in the middle of the track, and there is no interference with the axle journal boxes or other parts. The leg 32 is provided with an aperture 34 therethrough, which is adapted to cooperate with the holding device of the present preferred form, although the angle plate could be used without the aperture.

The embodied form of cooperating means on the hauling and holding device is adapted to automatically receive the car as it advances and automatically to leave the car at the proper point, also to push it on the level or upgrade, and to hold it to a desired speed and on the track on down-grades, and to so hold back the car and control it in going over the steep track at the dump. In such embodied form (see especially Figs. 5, 6 and 7), a dog 35 is mounted upon the body 22, and has an upwardly projecting arm 37 adapted to engage the leg 32 of the angle plate and push the car, as shown in Figs. 3, 4, 5 and 6. To permit the leg 32 to pass the arm 37 and get in front of it, thereby allowing the car first to pass, and then to be pushed by, the dog 35, the dog rocks on a pivot 36, the arm 32 passing thereover and therebeyond. The arm 37 then swings backwardly behind the leg 32, as shown in Figs. 3 and 6. For the purpose of bringing the dog 35 back to position behind the leg 32, the dog is provided preferably with a weighted tail 38.

The embodied form of device for holding back the car comprises a fixed hook 39 at the forward part of the body 22, having a rearwardly projecting end 40, in line with the aperture 34 in the leg 32 of the angle plate 30. When the car is propelled forward by gravity, and leg 32 leaves the arm 37, hook 40 enters aperture 32, and thus not only holds the car back, but also holds it down on the track. The device would hold the car back without the aperture 34 or the hook 40. The holding back action of the hook is shown in Fig. 7ª of the drawings.

In Fig. 28 is shown an embodiment of the car hauling and holding device, especially adapted to engage a car overtaking said device as well as a car overtaken by the device. In this form of the device, the hook 40 is not rigid on the body 22 of the device, but is pivotally mounted, like the arm 37. The hook 40 is pivoted at 41 upon the body 22, and has a weight 42 tending to keep it in upright position. When the hauling and holding device overtakes a car, hook 40 will strike the plate 32 fixed to and dependent from the car, and will be rocked to the left in Fig. 28, and after the plate 32 has passed, hook 40 will again spring upright, due to the weight 42, and the angle plate 32 of the car will be between arm 37 and hook 40 as shown in Figs. 3, 6 and 7.

To effect the disengagement of the car and the hauling and holding device, the tracks 18 and 19 for the device are bent downwardly, relatively to the tracks 20 and 21 for the car at the place of disengagement (see Figs. 1 and 7). Thus the leg 32 will pass above and clear of the hauling and holding device (see Fig. 7) without any special mechanism and without any manipulation of the mechanism as described.

The tracks 18 and 19 are thus depressed at the approach to each of the sheaves 16 and 17 for the car hauling system (Figs. 1, 2 and 12). These tracks are not needed around the sheaves, although they could be so used, and they are shown discontinued about the sheaves. The tracks 18 and 19 begin again on the other side of the sheaves 16 and 17, having flared ends to receive and guide the wheels of the hauling device on to the rails, and are inclined upwardly to bring the hauling and holding device into engaging position with respect to the cars on the track. The hauling device may catch the car as it rises over the inclined tracks 18 and 19, but this is not essential, as the car can overtake the hauling device, enter it and thereafter be held thereby until it reaches the place of discharge or disengagement.

This construction is provided at both the receiving end and at the discharging end of the system. That is, the car after it has been dumped, is released, by such a disengagment of the car and the hauling device, and runs over the reversing switch 11 by gravity. The empty car enters track 10, and is again taken by a hauling and holding device which has passed around sheave 16, and is now traveling in the opposite direction along track 10, and is propelled along track 10 to the final point of discharge, which in Fig. 1 is near the point of first receiving the loaded cars. Here, the above-described construction and operation are substantially duplicated, the empty cars being released from, and the loaded cars being engaged by, the hauling and holding device, which passes around sheave 16 and reverses its direction. At the sheaves 16 and 17, the end of tracks 17 and 18 which receive the car hauling devices 22 from the sheave are preferably flared as shown at 67 in Fig. 11.

In Fig. 1, an ordinary form of track scale 5 is diagrammatically shown, and the tracks 18 and 19 may be continuous over the scale, as the hauling device is of a form which will not interfere with the weighing of the loaded car, as the angle plate on the car is free to move in front of the arm of the hauling device. If desired, however, the tracks 18 and 19 may be broken at the scale edges, in the same manner as the car tracks themselves. In Fig. 24 the tracks 18 and 19 are shown continuous over the scale 5, and in Fig. 25 the tracks 18 and 19 are shown broken at the scale 5.

Referring to the car dumping mechanism (Figs. 1, 8, 9, 10), the car is dumped by running it over a steep portion of the track, the end gate of the car being at the same time released, so that the coal or other material will slide out of the car into a receiving chute or other receiving means. Any end gate tripping or releasing means may be employed at this point, numerous such devices being well known, or the end gate may be released by hand by an attendant. As embodied, the car runs over the top or crown 45, and down the steeply inclined reach 46 of the track (see Fig. 8). The car is preferably sent very slowly over the crown 45 of the track, so that the coal or other material is emptied very gradually, being damped or held back somewhat by the loose end gate of the car. The particular means for effecting this slow movement and dumping of the car will be described hereinafter. In Fig. 8, several successive positions of the car during the dumping operation are shown diagrammatically. During the descent of the steep track 46 the car is held securely on the hook 40 of the hauling and holding device, as shown in Fig. 7$^a$ of the drawings.

By this slow dumping of the car, the coal is discharged gradually to the screens, picking tables, or other receiving devices which may be used, and this conduces to cleanness of the coal, and prevents choking of the receiving devices. There is thus provided a gradual discharge of the coal or other material over the cleaning mechanism, whereby the shale, slate and other refuse may be picked out or the culm or slack may be properly separated.

In Figs. 1, 8 and 13 the receiving means shown for the dumped coal is a chute 47 and an endless conveyor 48, leading to any suitable device or means of disposal. The usual arrangement of screens or picking tables may be used at any desired point, and the conveyor 48 may lead thereto.

After the car is dumped, it passes along the track under the control of the hauling and holding device, the grade of the track being gradually reduced as shown in Figs. 1 and 8, and best in the latter figure. As the car approaches the releasing point with respect to the hauling and holding device, there is a slight up-grade, which will bring the leg 32 against the arm 37, and the car and the hauling and holding device automatically separate, each going its own way, in the manner illustrated in Fig. 7, without special manipulation and without any special mechanism.

In practice it is preferable to provide devices cooperating to hold the car on the rails in passing over the steep dump track. One embodiment of such means is shown in Figs. 9 and 10 of the drawings. In such embodied form, guides 52 and 53 are provided, substantially of the height of the car wheels 50 and 51, the treads of the wheels traveling within the guides, and the wheels being held down thereby. In such embodied form, channels or channel beams 54 and 55 are provided, which take the place of the rails 20 and 21 in passing over the dump. The juncture of the rail and channel, and the position of the wheel tread and flange, respectively, in the channel are clearly shown by Figs. 9 and 10. The lower flange of the channel has its inner surface on a level with the rail head, and the upper flange of the channel takes over the top of the wheel tread, the wheels thus being boxed within but free to run along the channels. The channel flanges may be somewhat flared at the turn 46 at the top of the dump to avoid danger of the wheels binding. At the bottom of the dump, the channels again deliver the car wheels to the rails, and this arrangement will be the same or similar with that shown in Figs. 9 and 10, and further illustrating is not deemed necessary.

The hauling and holding devices, as already stated, pass over guiding and driving means at the ends of its path or travel (see especially Figs. 1, 11 and 12). The embodied form of such means comprises a sheave wheel or spider 16 or 17, at either end, having a shaft 57 mounted in suitable bearings formed on the frame or base of the device. As embodied the spiders 16 and 17 have arms 58 provided at their outer end with pockets 59 for receiving the chain or cable 15 therein. The arms 58 and pockets 59 are preferably spaced so that the hauling and holding devices 22 will come directly in front of a pocket 59, and thereby provide the means of application of the power to the hauling device. The ends of the tracks 18 and 19 may be flared as shown at 67 in Fig. 11 to receive the wheels 23 and 24 as the devices 22 come off the sheave.

Suitable driving means are provided, applied to either one or both of the sheaves or spiders 16 and 17, and such driving means are shown somewhat diagrammatically in Fig. 17. On shaft 57 of the spider 17 is fixed a bevel gear 60, meshing with a bevel gear 61 fixed upon a shaft 62. Fixed on shaft 62 is a gear wheel 63, meshing with a pinion 64, which is fixed on the shaft of a motor 65. It will be understood that suitable reducing gear or other known driving devices may be added or substituted in the practical use of the device in accordance with well-known engineering usage.

Suitable devices may be provided in the chain or cable 15 for taking up slack, or otherwise regulating its length. In Fig. 11 a turn buckle 66 is shown for this purpose.

Reference has already been made to automatic devices for sending the car over the crown 45 of the dump very slowly and gradually. An embodiment of such means is diagrammatically shown in Figs. 15, 16 and 17 of the drawings. In such embodiment, a track switch 70 is located near or just in advance of the crown 45 of the dump track. A lever 70 is pivoted at 71, and the arm 72 thereof is pivotally connected by a link 73 to an arm 74 of a controller 75.

A cooperating track operated switch 76 is located near the bottom of the dump track, or steep portion of the track, and is pivoted at 77. An arm 78 of the lever 76 is pivotally connected by a rod 79, a lever 80 (which is pivoted at 81) and a rod 82 to another arm 83 of the controller 75. The controller 75 has circuit connections 84 to the motor 65.

The manner of operation of the foregoing mechanism is substantially as follows:

The loaded car in approaching the crown 45 of the dump, moves switch lever 70 from the position of Fig. 15 to that of Fig. 16, and thereby slows down the motor 65, which, through the spider or driving sheave 17 and the car hauling and holding mechanism, brings the loaded car to very slow speed. The car then passes very slowly and gradually over the crown of the dump, and the contents of the car are very slowly and gradually discharged as already described. The moving of lever 70 to the position of Fig. 16 has brought the switch lever 76 into position to be operated by the car wheel. As the car passes switch lever 76, it throws it from the position of Fig. 16 to that of Fig. 15, and through controller 75, motor 65 is again speeded up, and the car goes forward at full speed to the point of separation from the hauling and holding device, and from thence to the automatic reversing switch, and then back to the point where it is again taken by the holding and hauling device.

In accordance with certain features thereof, the invention is designed for application to the dump alone, other devices being provided for handling the cars in bringing them to the dump and in taking them away therefrom. An embodiment of such mechanism is shown in Figs. 13 and 14 of the drawings. At the crown of the dump, the holding device under the speed control of automatic mechanism, or an operative, receives the car, and holds and controls it in its descent over the dump, afterwards automatically releasing the car. As embodied, this device is brake-operated, and as a safety device the brake is normally on, that is, in locking position. The brake may be either left on, so that the weight of the car will permit it to descend very slowly, or an operator may have a lever by which he may release the pressure on the brake, so that after it has gone very gradually over the crown of the dump it may be speeded to any degree desired.

Referring in detail to the embodied mechanism, a chain 90 is provided having car-holding devices 91 at various points along its length. The endless chain 90 passes over sprocket wheels 92 and 93 at the ends thereof, the teeth of the sprocket wheel meshing with the chain and controlling its travel. Sprocket wheel 93 is carried on a shaft 94, journaled in suitable bearings, not shown. Sprocket wheel 92 is fixed on a shaft 95, likewise suitably journaled. On shaft 95 is fixed a brake drum 98, provided with a tight brake band 97, having sufficient pressure, through the action of weights or springs, in a well known manner, to ordinarily lock the mechanism, or to permit but very slow movement of a loaded car down the inclined dump. A lever 98 is provided by which the workman may relieve the drum brake pressure to a slight degree if desired.

The car holding device 99 will be brought to rest just in advance of the crown of the dump, that is a little to the left thereof in Fig. 13, so as to catch the advancing car and hold it. The car then passes over the dump under speed control in the manner already described. When the sprocket wheel 93 is reached, the holding device 99 will pass around the wheel 93 and thereby automatically release the car.

Where it is desired to gradually speed up the car while holding it under control, a second brake controlled mechanism, generally similar to that just described, may be provided, the empty car passing thereto and into the control thereof just after its release from the holding device 99. This mechanism may be brake-controlled, like that already described, but adapted to run at a higher speed by reason of less brake pressure. Such a mechanism is shown at 100 in Fig. 18, and need not be described in further detail. The chain of the device 100 may be somewhat slack and its upper reach may run over a curved support 101, which will permit the holding device corresponding to 99 to hold the car despite changes in the curvature of the track.

The sprocket chain 90 may be applied also to the level and inclined tracks other than the dump, and could be substituted for the car haul of Figs. 1 and 2, so far as concerns certain features of the invention.

Figs. 18 and 19 are a diagrammatic showing of an exemplification of the application of the mechanism of Figs. 13 and 14 to a mine slope and its dump, Fig. 18 being an elevation or profile and Fig. 19 a corresponding diagrammatic plan. The slope mouth is shown at 110, and a slope haul is conventionally shown at 111. This may be of the form of chain 90, or may be of any suitable or well known form. A scale for weighing the loaded car is shown at 112. The dumping mechanism, indicated by 113 may be regarded as corresponding to that of Figs. 13 and 14. An upwardly inclined track 114 receives the empty cars, and they are propelled upwardly by the car propelling device 115, which may be generally similar to the chain 90 and car holding device 99 of Figs. 13 and 14, but in this instance the mechanism would be power driven instead of brake held and controlled. The empty cars after reaching the top of track 114 switch automatically, in a well known manner to track 115, and are returned at a gentle gradient to the slope haul 111, and pass back down the slope under control.

In Figs. 20 and 21 is shown a mechanism for holding, while passing over the steep incline of the dump, a type of car provided with a standard or well-known brake mechanism carried on the car, the ordinary mining car not having a brake, but being controlled on grades by sprags put in the wheels.

In Figs. 20 and 21 brake blocks 120 are mounted at either side of the car and to effect the braking action are adapted to be pressed down upon and between the car wheels. The brake blocks are mounted on arms 121, fixed on rods 122, which rods are rotatably supported in brackets 123, the brackets being mounted on the sides of the car. Fixed to respective rods 122 are arms 124, to which are pivoted links 125. Links 125 are pivoted to an operating lever 126, with which cooperates a toothed holding bar 127.

While in many or most instances, the car hauling and holding device will be found sufficient, it may be advisable to apply a device for holding the car on the tracks as it passes over the dump. In the embodiment of Figs. 20 and 21, this holding means cooperates with the brake blocks 120, and the holding means may be formed or positioned to set the brakes in going over the dump incline. As embodied it comprises guide bars 128, supported at either side of the track, and as a car advances, the brake blocks 120 on either side thereof pass underneath the curved receiving ends 130 of the guides 128. The brakes are thus applied, and are kept applied so long as the brake blocks 120 slide along beneath the bars 128, while the car is descending the dump incline. When the car passes beyond the dump, the brake blocks 120 pass from beneath the bars 128, and the brake pressure is released.

It will also be obvious that with the ordinary or old-fashioned construction of mining car, which has no brakes, where it is desired to run the rails 20 and 21 over the dump instead of using guides like 52 and 53, the bars 128 would be positioned to bear on the tops of the wheels, instead of on the brake blocks, and this mechanism will take the place of the channels 52 and 53 previously described.

Side guides 131 may be employed at either side, if desired, to prevent the car jumping the track sidewise, although they will be usually found unnecessary.

Where it is desired to make the turn or curve of the track from the inclined dump or dumping section or portion of the track relatively short or abrupt, this may be done, but if the curve is so shortened, the forward end of the car will pass downwardly between the rails 20 and 21. This is practicable, as the bar body is narrower than the rail gage as will be seen from Figs. 4, 21, 22 and 23.

When this occurs, it is necessary that the cable or chain 15 and track rails 18 and 19 be sufficiently below the level of tracks 20 and 21 that the front end of the car will not strike them in passing the curve at the bottom of the dump. For this purpose in the form of mechanism shown in Figs. 22 and 23, rails 20 and 21 are considerably higher than rails 18 and 19, thereby allowing sufficient clearance for the downward dipping of the forward end of the car at the bottom end of the dump as just described.

In Fig. 22, arm 37 and hook 40 are elongated to allow for the additional space or clearance beneath the car. In Fig. 23, the entire car hauling and holding device is constructed of larger size throughout for the same purpose. As this is largely a mere matter of proportion of parts, no detailed description is deemed necessary.

If desired also, the sharp turn or curve may be employed at the bottom of the dump and the car hauling and holding device may be arranged to leave or release the car at that point, or just before there would be interference with the forward end of the car as it passed downwardly between the rails, and such an arrangement is shown in Figs. 13 and 18. The speed of the car due to such release could be controlled by the track gradient just beyond this point.

In Figs. 26 and 27 is shown a mechanism whereby the car is dumped in passing upwardly over the inclined dump or dumping section of the track, while being held and hauled by the mechanism. Fig. 26 is a diagrammatic profile or elevation of such a mechanism and track system adapted to a mine.

At 135 is shown the mouth of a mine slope or drift. The track 136 is the loaded or out-coming track for the cars loaded with coal coming out of the mine. The loaded cars pass over scale 140 and are weighed. These loaded cars run by gravity due to a gentle gradient along to the reversing switch 137. The track here takes a gentle up grade, and the cars consequently stop beyond switch 137, and begin traveling in the opposite direction. Switch 137 directs the loaded cars on to track 138, and by a gentle gradient, the cars run to the bottom 139 of the dump or dumping section.

At 139 the several cars as they arrive, are engaged by a hook 141 engaging the leg 32 on the car. Hook 141 is fixed on an endless sprocket chain 142, running over sprocket wheels 143 and 144, mounted respectively on shafts 145 and 146, journaled in suitable supports. This chain 142 may be substantially the same in construction as chain 90, previously described and shown in Figs. 13 and 14, and hook 141 may be like hook 99.

Chain 142 is driven in any suitable manner, and in Fig. 27, there is shown fixed on shaft 146 of sprocket wheel 144, a gear 147. With gear 147 meshes a pinion 148, which is fixed on the shaft of a motor 149.

In this construction, the car is dumped as it ascends the steep dump track. As in the other cases, any known or suitable form of end gate opening means may be employed, or the car end gate may be opened by hand if desired.

In certain cases, if the track gradient from the crown or top of the dump is sufficiently heavy to require it, a holding back mechanism may be provided for the empty cars after leaving the dump. Such a mechanism is shown in Figs. 26 and 27, and may be brake operated.

As embodied, an endless sprocket chain 150 is arranged along the empty car track. Chain 150 runs over sprocket wheels 151 and 152, which wheels are carried, respectively, on shafts 153 and 154. Fixed to shaft 154 is a brake mechanism 155 which by weights or spring action is adjusted to let the cars down to the mine mouth at a proper speed.

In Fig. 5ª is shown guiding means or trackways for the hauling and holding device which will hold it down to the trackway as well as guide it therealong. As embodied, channel guides 160 and 161, generally similar to the channels 52 and 53, shown in Figs. 9 and 10 applied to the mine cars may be employed. The wheels 23 and 24 run within the channels 160 and 161, whereby the hauling and holding device 22 is not only guided but is held down to the track against any lifting strains or tendencies. On grades the mine car will be held also by the hook 40 engaging therewith. The channels may be used all along the path of the hauling and holding device 22, or only on steep grades, on concave vertical curves and the like. By so holding the device 22, the mine or other car is thereby held to the track and the devices or guides 160, 161 and 52, 53 may be used alternatively if desired. This device will hold the hauled mine or other car to the track, and will also prevent the rope or chain 15 lifting the hauling device off the track.

It will be understood that the different arrangements of tracks, and of other features are illustrative and not restrictive of the invention, and furthermore, that changes may be made from the details of structure as shown and described without departing from the principles of the invention, and without sacrificing its chief advantages.

What I claim is:—

1. A car dump including in combination a track having relatively flat and steep parts, the flat part leading into the relatively steep part where the car is dumped and means controlled by the car for controlling the speed of the car as it enters the steep part and is dumped.

2. A car dump including in combination a track having relatively flat and steep parts, the flat part leading into the relatively steep part where the car is dumped and means controlled by the car for moving the car very slowly as it enters the steep part to effect a gradual dumping of the contents.

3. A car dump including in combination a track having relatively flat and steep parts, the flat part leading into the relatively steep part where the car is dumped and means controlled by the car for moving the car very slowly as it enters the steep part to effect a gradual dumping of its contents and for speeding up the car after it is dumped.

4. A car dump including in combination a track having relatively flat and steep parts, the flat part leading into the relatively steep part where the car is dumped and electrically operated car-controlled means for controlling the speed of the car as it enters the steep part and is dumped.

5. A car dump including in combination a track having relatively flat and steep parts, the flat part leading into the relatively steep part where the car is dumped and electrically operated means controlled by the car for controlling the speed of the car as it enters the steep part and is dumped.

6. A car dump including in combination a track having relatively flat and steep parts, the flat part leading into the relatively steep part where the car is dumped and electrically operated means controlled by the car for moving the car very slowly as it enters the steep part to effect a gradual dumping of the contents.

7. A car dump including in combination a track having relatively flat and steep parts, the flat part leading into the relatively steep part where the car is dumped and electrically operated means controlled by the car for moving the car very slowly as it enters the steep part to effect a gradual dumping of its contents and for speeding up the car after it is dumped.

8. A car dump including in combination a track having relatively flat and steep parts, the flat part leading into the relatively steep part where the car is dumped and means for moving the car very slowly as it enters the steep part to effect a gradual dumping of the contents, an electric drive therefor and a controller therefor operated by the car.

9. A car dump including in combination a track having relatively flat and steep parts, the flat part leading into the relatively steep part where the car is dumped and means for moving the car very slowly as it enters the steep part to effect a gradual dumping of the contents and for speeding up the car after it is dumped, an electric drive therefor and a controller therefor operated by the car.

10. A car dump including in combination a track having a relatively steep part thereof inclined at a greater angle than the angle of repose of the material conveyed in a car, means for traveling the car along the track and over said inclined part thereof, including a device engaging the car to hold it on the incline, whereby the conveyed material is slid from the car along the bottom thereof by the action of gravity, and means operating automatically to control the speed of the car on said steep part of the track.

11. A car dump including in combination a track having a relatively steep part thereof inclined at a greater angle than the angle of repose of the material conveyed in a car, means for traveling the car along the track and over said inclined part thereof, including a device engaging the car to hold it on the incline, whereby the conveyed material is slid from the car along and lengthwise of the bottom thereof by the action of gravity, and means operating automatically to control the speed of the car on said steep part of the track.

12. A car dump including in combination a track having a relatively steep part thereof inclined at a greater angle than the angle of repose of the material conveyed in a car, means for traveling the car along the track and over said inclined part thereof, including a device engaging the car to hold it on the incline, whereby the conveyed material is slid from the car along the bottom thereof by the action of gravity, and means operating automatically and actuated by the car entering on said steep part of the track to control the speed of the car on said steep part of the track.

13. A car dump including in combination a track having a relatively steep part thereof inclined at a greater angle than the angle of repose of the material conveyed in a car, means for traveling the car along the track and over said inclined part thereof, including a device engaging the car to hold it on the incline and controlling its speed whereby the conveyed material is slid from the car along its bottom and in the direction of travel of the car by the action of gravity, and automatically operating speed varying devices for slowing down the car as it passes along said steep part of the track and the conveyed material is discharged.

14. A car dump including in combination a track having a relatively steep part thereof inclined at a greater angle than the angle of repose of the material conveyed in a car, means for traveling the car along the track and over said inclined part thereof, including a device engaging the car to hold it on the incline and controlling its speed whereby the conveyed material is slid from the car along its bottom and in the direction of travel of the car by the action of gravity, and automatically operating speed varying devices actuated by the car entering said steep part of the track for slowing down the car as it passes along said steep part of the track and the conveyed material is discharged.

15. A car dump including in combination a track having a relatively steep part thereof inclined at a greater angle than the angle of repose of the material conveyed in a car, means for traveling the car along the track and over said inclined part thereof, including a device engaging the car to hold it on the incline, whereby the conveyed material is slid from the car along the bottom thereof by the action of gravity while the car continues its travel under the control of said engaging and holding device, and means operating automatically to control the speed of the car on said steep part of the track.

16. A car dump including in combination a track having a relatively steep part thereof inclined at a greater angle than the angle of repose of the material conveyed in a car, means for traveling the car along the track and over said inclined part thereof, including a device engaging the car to hold it on the incline, whereby the conveyed material is slid from the car along the bottom thereof by the action of gravity while the car continues its travel under the control of said engaging and holding device, and means operating automatically and actuated by the car entering on said steep part of the track to control the speed of the car on said steep part of the track.

17. A car dump including in combination a track having a relatively steep part thereof inclined at a greater angle than the angle of repose of the material conveyed in a car, means for traveling the car along the track and over said inclined part thereof, including a device engaging the car to hold it on the incline and controlling its speed whereby the conveyed material is slid from the car along its bottom and in the direction of travel of the car by the action of gravity and while the car continues to travel in the same direction, and automatically operating speed varying devices for slowing down the car as it passes along said steep part of the track and the conveyed material is discharged.

18. A car dump including in combination a track having a relatively steep part thereof inclined at a greater angle than the angle of repose of the material conveyed in a car, means for traveling the car along the track and over said inclined part thereof, including a device engaging the car to hold it on the incline and controlling its speed whereby the conveyed material is slid from the car along its bottom and in the direction of travel of the car by the action of gravity and while the car continues to travel in the same direction, and automatically operating speed varying devices actuated by the car entering said steep part of the track for slowing down the car as it passes along said steep part of the track and the conveyed material is discharged.

19. A car dump including in combination a track having a relatively steep part thereof inclined at a greater angle than the angle of repose of the material conveyed in a car, means for traveling the car along the track and over said inclined part thereof, including a cable running along the track and attached thereto a device engaging the car to hold it on the incline and controlling its speed whereby the conveyed material is slid from the car along its bottom and in the direction of travel of the car by the action of gravity, and automatically operating speed varying devices for slowing down the car as it passes along said steep part of the track and the conveyed material is discharged.

20. A car dump including in combination a track having a relatively steep part thereof inclined at a greater angle than the angle of repose of the material conveyed in a car, means for traveling the car along the track and over said inclined part thereof, including a cable running along the track and attached thereto a device engaging the car to hold it on the incline and controlling its speed whereby the conveyed material is slid from the car along its bottom and in the direction of travel of the car by the action of gravity, and automatically operating speed varying devices actuated by the car entering said steep part of the track for slowing down the car as it passes along said steep part of the track and the conveyed material is discharged.

21. A car dump including in combination a track for loaded cars including a portion sufficiently steep to dump a car endwise thereof by gravity, a conveyor having means for engaging and holding a loaded car as it passes over said steep portion of the track, a track for the empty cars, and an automatic switch for switching the cars from one track to the other.

22. A car dump including in combination a track for loaded cars including a portion sufficiently steep to dump a car endwise thereof by gravity, a conveyor having a dog for engaging and holding a loaded car as it passes over said steep portion of the track, a track for the empty cars, and an automatic switch for switching the cars from one track to the other.

23. A car dump including in combination a track for loaded cars including a portion sufficiently steep to dump a car endwise thereof by gravity, a conveyor having means for engaging and holding a loaded car as it passes over said steep portion of the track, a cooperating track, and an automatic switch for switching the cars from one track to the other.

24. A car dump including in combination a track for loaded cars including a portion sufficiently steep to dump a car endwise thereof by gravity, a conveyor having means for engaging and holding a loaded car as it passes over said steep portion of the track, a track for the empty cars, an automatic switch for switching the cars from one track to the other, and cooperating means for reversing the direction of the travel of the car between the two tracks.

25. A car dump including in combination a track for loaded cars including a portion sufficiently steep to dump a car endwise thereof by gravity, a conveyor having a dog for engaging and holding a loaded car as it passes over said steep portion of the track, a track for the empty cars, and an automatic switch for switching the cars from one track to the other, and cooperating means for reversing the direction of the travel of the car between the two tracks.

26. A car dump including in combination a track for loaded cars including a portion sufficiently steep to dump a car endwise thereof by gravity, a conveyor having means for engaging and holding a loaded car as it passes over said steep portion of the track, a cooperating track, an automatic switch for switching the cars from one track to the other, and cooperating means for reversing the direction of the travel of the car between the two tracks.

27. A car dump including in combination a track for loaded cars including a portion sufficiently steep to dump a car endwise thereof by gravity, a conveyor having means for engaging and holding a loaded car as it passes over said steep portion of the track, a track for the empty cars, and means for reversing the direction of a car and transferring it from one track to another.

28. A car dump including in combination a track for loaded cars including a portion sufficiently steep to dump a car endwise thereof by gravity, a conveyor having a dog for engaging and holding a loaded car as it passes over said steep portion of the track, a track for the empty cars, and means for reversing the direction of a car and transferring it from one track to another.

29. A car dump including in combination a track for loaded cars including a portion sufficiently steep to dump a car endwise thereof by gravity, a conveyor having means for engaging and holding a loaded car as it passes over said steep portion of the track, a cooperating track, and means for reversing the direction of a car and transferring it from one track to another.

30. A car handling and dumping mechanism including in combination a track having a substantially level part leading into a part of relatively small inclination and then into a part of greater inclination, an automatic car hauling mechanism running along the trackway and adapted to hold a car on said inclined parts of the track, and means operating on said car hauling mechanism for controlling the speed of the car as it passes from the level part of the track onto the part of small inclination and thence to the part of greater inclination.

31. A car handling and dumping mechanism including in combination a track having a substantially level part leading into a part of relatively small inclination and then into a part of greater inclination, an automatic car hauling mechanism running along the trackway and adapted to hold a car on said inclined parts of the track, and means controlled by the car and operating on said car hauling mechanism for controlling the speed of the car as it passes from the level part of the track onto the part of small inclination and thence to the part of greater inclination.

In testimony whereof, I have signed my name to this specification.

RICHARD PEALE.